Patented June 24, 1947

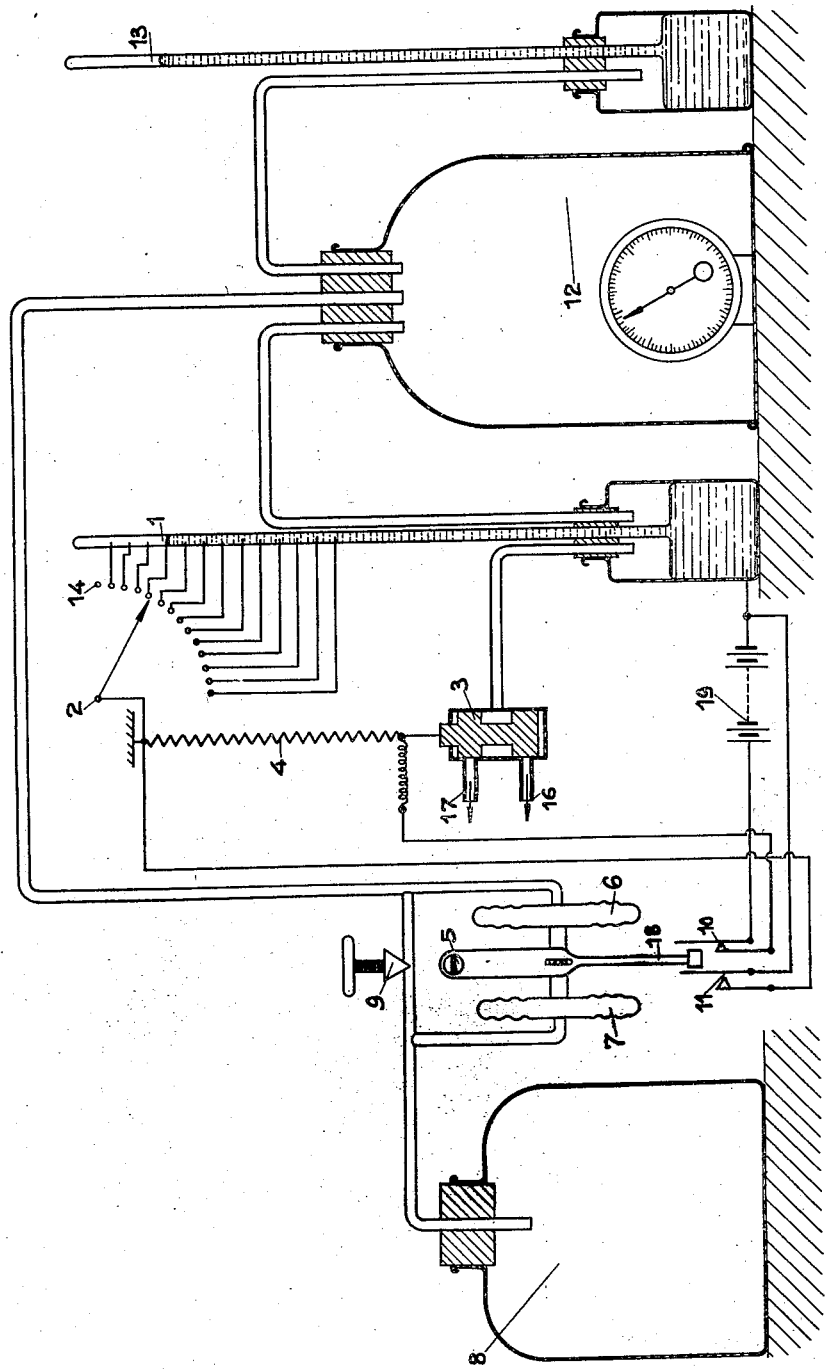

2,422,702

UNITED STATES PATENT OFFICE 2,422,702

APPARATUS FOR TESTING ALTIMETRIC DEVICES

Charles Hilaire Henri Rodanet, Neuilly-sur-Seine, France; vested in the Attorney General of the United States Application October 22, 1940, Serial No. 362,230 In France September 1, 1939

5 Claims. (Cl. 73—1)

1

The present invention has for main object an automatic device for creating and maintaining in a closed chamber or enclosure a predetermined partial vacuum; it also includes an improvement by means of which the speed for automatically obtaining said partial vacuum and for re-establishing atmospheric pressure is adjustable at will. Finally, it includes all applications of said device and of its improvement; however, the invention is more particularly applied to the control of the graduation of altimetric, manometric and like apparatus.

In its construction, the device is mainly characterised by the fact that the closed chamber or enclosure is connected to a cock or the like, arranged to put said enclosure in communication either with the atmosphere, or with a source of partial vacuum, according to its position, said cock being electrically controlled by a circuit comprising a first adjusting switch, actuated by hand, and a second switch automatically actuated by a standard pressure-gauge which measures the pressure in the enclosure.

Functionally, the device is characterised by the fact that when the pressure in the enclosure exceeds the value corresponding to the position initially given to the hand adjusting switch, the control circuit is in such condition that the cock puts the enclosure in communication with the source of partial vacuum; whereas, when the pressure in the enclosure becomes lower than the adjusted value, the manometric switch changes the condition of the control circuit so that the cock puts the enclosure in communication with the atmosphere.

The device can of course have several forms of construction, in which the control circuit is closed when the pressure in the enclosure exceeds the value corresponding to the position initially given to the hand adjusting switch, and the position of the cock putting the enclosure in communication with the source of partial vacuum, corresponds to the excitation of the control circuit.

It will be seen that the apparatus comprises means adapted to place the contact position of the automatic switch under the control of that of the adjusting switch; now, numerous control means of this kind are known, and it can be said, in that sense, that the invention is characterised by the new application of these known means to the control of a manometric switch, in order to obtain new industrial results, particularly when the device is used for controlling the graduation of altimetric, manometric or like apparatus.

2

The control of altimetric apparatus is usually effected by arranging the latter under a vacuum bell in which a pressure is created corresponding to that of the various altitudes at which the indication supplied is to be controlled. This bell is usually in communication with the atmosphere and a vacuum pump, by means of conduits provided with cocks. These cocks are actuated by hand until a standard pressure-gauge connected to the bell indicates the desired value.

Now, experience has shown that it is extremely long and laborious to obtain these exact pressures within 0.1 m. m., when the operation is repeated many times, owing to the oscillations of the mercury column and to the slowness with which it comes to equilibrium, then, owing to the fact that the changes of pressure of the air in the bell determine variations of temperature, equilibrium with the surrounding medium is only re-established slowly. Finally, notwithstanding all the care taken, an error always subsists, called the personal equation.

The invention allows of obtaining automatically, exactly, and in the minimum time, any desired pressure in the vacuum bell.

The device generally characterised above can be constructed according to various forms, all included in the invention, and which can differ from each other, in particular, by the nature of the cock, of the source of partial vacuum, of the hand adjusting switch, of the automatic switch, of the electric wiring putting said second switch under the control of the first one, of the standard pressure-gauge actuating the automatic switch, etc. It is obvious that each of these various members can be any one of those used in the art and not only those which will be described hereinafter in a particular form of construction of the invention taken by way of example.

The improvement by means of which it is possible to adjust at will the speed with which the desired partial vacuum is obtained and the speed with which atmospheric pressure is re-established, is characterised, in its construction, by a normally open contact which, when it is closed, shunts both switches of the control circuit; by a normally closed contact arranged in series on the control circuit; and by an adjustable leakage variometer controlling said contacts.

Functionally, said improvement is characterised by the fact that if the speed for obtaining the partial vacuum is too great, the variometer opens the normally closed contact, which cuts off the control circuit and actuates the cock in the direction for throttling the suction of the source of partial vacuum, whereas, if the speed for reestablishing atmospheric pressure is too great, the variometer closes the normally open contact, which closes the control circuit and actuates the cock in the direction for throttling the communication with the atmosphere.

It will therefore be seen that, in the vacuum bell, the pressure will be established according to a law corresponding to a constant upward or downward speed of adjustable value; for instance 5, 10, 20 or 50 meters per second.

The three main elements of the preferred form of construction of the device, illustrated by way of example in the accompanying drawing, are constituted:

(1) By a mercury barometric pressure-gauge the vertical tube of which is preferably made of insulating material and provided with metal members which are contacted by the mercury column.

(2) By an adjustable variometer controlling one or more electric contacts.

(3) By one or more air cocks controlled by the contacts of the barometric column or those of the variometer or both simultaneously. An electric switch allows of choosing the altitude at which the pressure in the bell is to be adapted, whilst a cock combined with the variometer allows of adjusting the upward or downward speed.

The operation for opening and closing the cock or cocks can be controlled by any suitable means such as an electromagnet, but preferably, by the expansion of a heated wire, the effect being more gradual.

The accompanying drawing illustrates the general diagram of the apparatus. Reference number 1 designates the mercury barometer having contacts; 2 the altitude switch, adjustable by hand; 3 a three-way cock controlled by the heated wire 4. The variometer 5 is composed of two capsules 6 and 7, an undistortable vessel 8 and a progressive cock 9; the variometer controls the contacts 10 and 11. The vat of the barometric pressure-gauge 1 is connected, on the one hand, to the cock 3 and, on the other hand, to the vacuum bell 12 connected in its turn to the variometer and to a control pressure-gauge 13, on which the actual pressure can be read. The vat of the barometric pressure-gauge 1 has a contact which is connected to one of the poles of a source of current 19; the circuit closes through the mercury contacts, switch 2, expansible wire 4 and reaches the other pole through the normally closed contact 10. The wire 4 can also be supplied with current through the normally open contact 11.

The operation is as follows:

When the switch 2 is on the dead contact-piece 14, the electric circuit is cut off, the wire 4 is cold and the cock 3 open to the atmosphere at 17. The switch 2 being shifted to the contact-piece corresponding, for instance, to an altitude of 3000 meters, the current passes through the wire 4, which expands, and the cock 3 opens to a vacuum pump (not shown) connected at 16. Suction takes place in the vat of the pressure-gauge 1 and in the vacuum bell 12 until the mercury column of pressure-gauge 1 reaches below the level of the contact-piece corresponding to 3000 meters, and cuts off the current. The wire 4 cools, actuates the cock which again tends to cause the pressure to increase.

Finally, equilibrium is obtained and the current passes intermittently through wire 4, heating it moderately, which maintains the cock or valve 3 closed. The pressure remains stable in the bell 12. It will be noted that said pressure is automatically fixed when going up or down, according to the contact-piece chosen for contact by the switch 2. The rate of change in the variation of pressure within the bell 12 is controlled by the cock 9 of the variometer. Thus, if the air within the bell is being withdrawn at a rate greater than that fixed by the variometer, the lever 18 will open the contact 10, this having the effect of cooling the wire 4 and of reducing the extent of opening of the cock 3 to the vacuum pump. If the rate of air admission to the bell is too great, the variometer will close the contact 11, wire 4 is supplied with current and reduces the extent of opening of cock 3 to the atmosphere. It will be noted that the rate of air flow controls fixed by the cock or valve 9 are independent of the volume of the bell 12.

What I claim as my invention and desire to secure by Letters Patent is:

1. Automatic apparatus for producing and maintaining a predetermined partial vacuum within a hollow container or enclosed member for testing altimetric devices, said apparatus including the hollow container for receiving such devices, a valve having a casing connected with the interior of said container and containing a movable valve member which in one position in said casing places said container in communication with a passageway adapted to be connected with a suction means and in another position places the container in communication with the atmosphere, a pressure gauge communicating with the interior of said container for measuring the pressure within the latter, an electric control circuit fed by a current source, electric shifting means in said circuit for moving said valve member upon closure of the circuit, a switch in said circuit operable by a movable portion of said pressure gauge for controlling the position of said shifting means, and including a manual adjusting switch member for predetermining the desired pressure in said container.

2. Automatic apparatus according to claim 1, having the switch of the control circuit closed when pressure prevails in the container in excess of that corresponding to the adjusted position of the manual adjusting switch member and the simultaneous position of the valve member in the valve casing placing the container in communication with the passageway adapted to be connected with suction means corresponds to closed operating condition of the control circuit.

3. Automatic apparatus according to claim 1, having a switch for controlling the rate of pressure variation in said container comprising a pair of normally closed contacts in series with the circuit, a pair of normally open contacts arranged in a shunt branch circuit shunting both the manual adjusting switch and said pair of normally closed contacts when said normally open contacts are in closed positions, and means responsive to a predetermined pressure condition within said container for actuating the normally open contacts to thereby close the shunt branch circuit.

4. Automatic apparatus according to claim 1 having a switch for controlling the rate of pressure variation in said container comprising a pair of normally closed contacts in series with the circuit and a pair of normally open contacts arranged in a shunt branch circuit shunting both the manual adjusting switch and said pair of normally closed contacts when said normally open contacts are in closed positions, a pressure responsive member in communication with the container, and a movable lever operated by said pressure responsive member in response to rate of change variations and arranged to open the normally closed contacts in one position and to close the normally open contacts in another position.

5. Automatic apparatus according to claim 1 having a switch for controlling the rate of pressure variation in said container comprising a pair of normally closed contacts in series with the circuit and a pair of normally open contacts arranged in a shunt branch circuit shunting both the manual adjusting switch and said pair of normally closed contacts when said normally open contacts are in closed positions, two pressure responsive members connected to each other by a conduit and in communication with the container, a movable lever operated by said pressure responsive members in response to rate of change variations and arranged to open the normally closed contacts in one position and to close the normally open contacts in another position, and a manually adjustable leak valve in the conduit between the pressure responsive members controlling the passage of pressure fluid from one to the other.

CHARLES HILAIRE HENRI RODANET.

REFERENCES CITED

The following references are of record in the file of this patent:

UNITED STATES PATENTS

| Number | Name | Date |
|---|---|---|
| 412,830 | Bosworth | Oct. 15, 1889 |
| 1,650,736 | Zelov | Nov. 29, 1927 |
| 1,861,886 | Slough | June 7, 1932 |
| 1,885,926 | Lewis | Nov. 1, 1932 |

FOREIGN PATENTS

| Number | Country | Date |
|---|---|---|
| 437,706 | Great Britain | Nov. 4, 1935 |